United States Patent [19]

Megahed et al.

[11] 4,078,127

[45] Mar. 7, 1978

[54] ADDITIVE FOR AN ALKALINE BATTERY EMPLOYING DIVALENT SILVER OXIDE POSITIVE ACTIVE MATERIAL

[75] Inventors: El Sayed Megahed; Carol Buelow, both of Madison, Wis.

[73] Assignee: ESB Incorporated, Philadelphia, Pa.

[21] Appl. No.: 789,471

[22] Filed: Apr. 21, 1977

[51] Int. Cl.$^2$ .............................................. H01M 6/06
[52] U.S. Cl. ..................................... 429/206; 429/219
[58] Field of Search ....................... 429/219, 218, 206

[56] References Cited

U.S. PATENT DOCUMENTS

| 3,575,723 | 4/1971 | Jerabek | 429/219 X |
|---|---|---|---|
| 3,580,740 | 5/1971 | James | 429/219 X |
| 3,639,176 | 2/1972 | Nordblom et al. | 429/219 X |
| 3,650,832 | 3/1972 | Tvarusko | 429/219 X |
| 3,853,623 | 12/1974 | Davis | 429/219 X |
| 3,959,012 | 5/1976 | Liang et al. | 429/219 X |

*Primary Examiner*—Anthony Skapars
*Attorney, Agent, or Firm*—Gilbert W. Rudman; Gary V. Pack; Anthony J. Rossi

[57] ABSTRACT

An alkaline battery having a divalent silver oxide (AgO) positive active material (cathode) in which a sulfide additive is incorporated into the alkaline electrolyte on the positive side of the battery separator or barrier or is added to the positive active material is provided. The sulfide additive improves the stability of the divalent silver oxide (AgO) active material in the aqueous alkaline electrolyte without adversely affecting the electrochemical reaction during the discharge of the battery. The additive consists of a sulfide of cadmium, calcium, mercury, tin, tungsten, or mixtures thereof.

10 Claims, No Drawings

ADDITIVE FOR AN ALKALINE BATTERY EMPLOYING DIVALENT SILVER OXIDE POSITIVE ACTIVE MATERIAL

BACKGROUND OF THE INVENTION

1. Field of the Invention

This invention relates to alkaline batteries containing divalent silver oxide cathode material. More particularly, it relates to additives for such batteries.

2. Prior Art

In the packaged power industry, there is an ever increasing emphasis upon the development of high capacity, small volume electric cells and batteries. The following is a comparison of some positive active materials currently used in commercially available cells:

| Active Material | EMF vs. ZN in Alkaline Electrolyte | Capacity ma-hr/g | a-hr/cc |
|---|---|---|---|
| HgO | 1.35v. | 248 | 2.76 |
| $Ag_2O$ | 1.60v. | 232 | 1.67 |
| AgO | 1.82v. | 432 | 3.22 |

The above comparisons clearly indicate that divalent silver oxide (AgO) has the highest capacity per gram or cubic centimeter and also the highest EMF. With the advancement of semi-conductor technology and the increasing use of semi-conductors in electronic devices, there is greater than ever need for high capacity, small volume packaged power sources having high voltages.

As shown by the preceding table, divalent silver oxide is an excellent high capacity positive active material having a relatively high EMF, but unfortunately, it has limited use as a battery active material because of its lack of stability when in contact with aqueous alkaline solutions. It is well-known that divalent silver oxide evolves oxygen when in contact with aqueous alkaline solutions, for example sodium hydroxide and potassium hydroxide, as represented by the following reaction:

$$2AgO \rightarrow Ag_2O + \tfrac{1}{2}O_2$$

As a result of this instability, alkaline batteries employing a divalent silver oxide positive material suffer a loss of capacity on activated stand because of the conversion of the divalent silver oxide to monovalent silver oxide. In addition, the gassing of the divalent silver oxide precludes its use in sealed cells and batteries because of the hazard of pressure build-up and possible explosion of the sealed cell. The formation of gas bubbles within the sealed cell also increases the impedance of the cell.

The properties of divalent silver oxide active material have been studied by many persons skilled in the battery art, and there are two articles relating to additives for silver oxide which have been published and which are particularly pertinent to this invention. "Electrode Phenomena of Silver-Silver Oxide System in Alkaline Batteries" by Shiro Yoshizawa and Zenichro Takehara published in the Journal of the Electrochemical Society of Japan, Volume 31, Number 3, pages 91-104 (1963) reports the effect of various metallic additives on the oxidation of silver electrodes. Among the additives studied by the Japanese, was gold which was reported to increase the rate of formation of divalent silver oxide during the electrochemical formation of silver electrodes, i.e., oxidation of silver. Another article entitled "The Electric Resistivity of Silver Oxide" by Aladar Tvarusko published in the Journal of the Electrochemical Society, Volume 115, Number 11, pages 1105-1110 (November, 1968) reported on various metallic additives and their effect on the electric resistivity of divalent silver oxide. The article reports that mercury added during the preparation of silver oxide decreased the electric resistivity of silver oxide.

The patent literature also contains publications disclosing additives for alkaline batteries employing silver positive electrodes. U.S. Pat. No. 3,617,384 issued to Kamai et al on Nov. 2, 1971 discloses a secondary zinc alkaline cell in which gold or silver, alloys thereof, oxides and hydroxides may be added to the zinc anode. U.S. Pat. No. 3,650,832 issued to Aladar Tvarusko on March 21, 1972 discloses certain additives for divalent silver oxide selected from mercury, selenium, tellurium and combinations of mercury with tin or lead. Japanese Patent Application No. 48-1929 was open to public inspection on Jan. 22, 1973 discloses adding gold hydroxide into the electrolyte of an alkaline silver oxide cell. U.S. Pat. No. 3,853,623 issued on Dec. 10, 1974 to Stuart M. Davis discloses gold ion additive for divalent silver oxide. U.S. Pat. No. 3,935,026 issued on Jan. 27, 1976 to Paul L. Howard discloses a cathode material which is a mixture of divalent silver oxide and sulfur and a cathode material which is a mixture of divalent silver oxide and silver sulfide. Great Britain Patent No. 1,065,059 published Apr. 12, 1967 discloses the addition of cadmium oxide, magnesium oxide, or aluminum oxide to a silver electrode.

SUMMARY OF THE INVENTION

It is the general object of this invention to provide an improved alkaline battery employing divalent silver oxide (AgO) positive active material and containing a sulfide additive in either the alkaline electrolyte on the positive side of the battery separator or barrier or in the positive active material. The additive consists of a sulfide of the cadmium, calcium, mercury, tin, tungsten, or mixtures of these sulfides. It is preferred that the divalent silver oxide active material comprise at least 50% by weight divalent silver oxide so as to improve the electrical conductivity of the active material and to provide a battery active material having a higher capacity. Other objects and advantages of this invention may be determined from the description which follows.

It has been discovered that certain sulfide additives incorporated in either the alkaline electrolyte on the positive side of the battery separator or barrier or in the divalent silver oxide active material substantially improves the stability of the divalent silver oxide active material in aqueous alkaline electrolyte without adversely affecting the electrochemical reactions during the discharge of the battery. It is generally preferred to incorporate the additive in amounts ranging from about 0.1 to about 10% by weight of silver present in the divalent silver oxide active material. Preferably the additive is physically admixed into the divalent silver oxide active material, although it is satisfactory to incorporate a soluble additive compound into the alkaline electrolyte used to prewet the divalent silver oxide active material.

DETAILED DESCRIPTION

It has been discovered that alkaline cells employing divalent silver oxide positive active material and certain sulfide additives in the alkaline electrolyte solely on the positive side of the battery separator or barrier or in the divalent silver oxide positive active material provide superior performance in terms of lower impedance, higher flash amperage as compared to identical cells without such additive in the alkaline electrolyte.

The sulfide additive may be incorporated into either the divalent silver oxide positive active material or the alkaline electrolyte. If desired, the sulfide additive can be incorporated into the battery by dissolving it in the alkaline electrolyte or it may be incorporated as a solid into the positive active material.

Since an object of this invention is to provide a divalent silver oxide active material having improved capacity and electrical conductivity, it is important that the active material contain at least 50% by weight divalent silver oxide (AgO) with the balance of the active material comprising monovalent silver oxide ($Ag_2O$) and metallic silver. The monovalent silver oxide has a relatively high electrical resistance, and therefore, it is important to keep the monovalent silver oxide content to a minimum. In addition, the monovalent silver oxide has much less capacity per unit weight than divalent silver oxide, and therefore, the divalent silver oxide is preferred. It is particularly preferred that at least about 90% of the positive active material be divalent silver oxide.

In order to provide an improved alkaline cell employing divalent silver oxide positive active material in accordance with this invention, it is preferred that the sulfide additive be incorporated into the battery in amounts ranging from about 0.1 to about 10% by weight of silver present in the positive active material. Though the additive is generally effective when present in these amounts, it may adversely affect the discharge of the battery when present in larger amounts, and when incorporated in the positive active material, the increased amount of the additive decreases the amount of the positive active material.

It is preferred that from 0.5 to 3% by weight of the additive be incorporated, and 1.25 – 2% by weight has been found to be particularly preferred.

The sulfide additives of this invention, cadmium sulfide, calcium sulfide, mercury sulfide, tin sulfide, and tungsten sulfide, all improve the stability of the divalent silver oxide active material. However the quality of improvement varies with the additive utilized.

Cadmium sulfide was found to be exceptionally effective in reducing the gassing rate of divalent silver oxide in alkaline solution, and thereby improving the physical stability of cells using AgO as the cathode material. It is effective at levels from 0.3 to 10% by weight of the AgO. However, little additional cell stability is gained by increasing the cadmium sulfide level above 3.0%. Most preferable, the level will be 1.25 – 2%, with about 1.5% being optimum.

In addition, cadmium sulfide was found to improve the voltage stability of cells having divalent silver oxide positive electrode material, both initially and after storage at room temperature. It also produced lower cell impedance and higher closed circuit voltages at the high drain rates need for LED watches.

Calcium sulfide, mercury sulfide, stannic sulfide ($SnS_2$) and tungsten sulfide had a significant effect, while stannous sulfide (SnS) and thallium sulfide had a slight effect.

The following examples illustrate the improved stability of divalent silver oxide positive active material in aqueous alkaline electrolyte. In the examples, all percentages of additives are based on the weight of silver present in the positive electrode material.

EXAMPLE 1

Watch battery cells of the RW 44 size were constructed and tested for shelf stability at elevated temperatures. The variable was the additive mixed with the divalent silver cathode material.

The cells were made from the following components:
Zinc Anode: 0.22 g of zinc anode blend containing 7% mercury and 0.2% guar gum.
Electrolyte: 40% KOH 1% ZnO aqueous solution.
Barrier: A polyethylene film grafted with methacrylic acid (Permion 2192 ®).
Cathode: The indicated level of additive with a mixture of 98.5% AgO, and 1.5% polytetrafluoroethylene.
Cathode Pellet: The cathode mix was compressed and then consolidated into the outer can with a retainer ring.

The stability was determined by measuring the cell expansion (bulging) after storage at 160° F for 1 week, 2 weeks and 3 weeks and at room temperature for 6 weeks. The results are listed in Table 1.

The effects of various additives on impedance, CCV and capacity were tested. The results are listed in Table 2.

TABLE No. 1

The effect of various additives on the stability of AgO-zinc cells. The gassing rate of AgO measured was 100 μl/gm/hr in 18% NaOH + 1.25% ZnO at 74° C. Expansion is in mils based on average of 10 cells/lot.

|   |   | Additive | 160° F 1 wks | 2 wks | 3 wks | Room Temperature 6 wks | No. of Dead Cells After 1 wk at 160° F |
|---|---|---|---|---|---|---|---|
| A |  | None | 12.9 | 23.4 | 28.9 | 1.0 | 0/10 |
| B | 0.3% | Au(OH)$_3$ | 13.0 | 18.3 | 20.0 | 1.0 | 0/10 |
| C | 3.0% | Au(OH)$_3$ | 12.3 | 13.4 | 14.0 | 0.5 | 6/10 |
| D | 0.3% | CdO | 13.9 | 20.1 | 26.4 | 1.0 | 0/10 |
| E | 3.0% | CdO | 9.0 | 16.7 | 25.0 | 1.0 | 0/10 |
| F | 0.3% | Ag$_2$S | 15.6 | 24.7 | 29.0 | 1.0 | 0/10 |
| G | 3.0% | Ag$_2$S | 11.2 | 17.5 | 19.2 | 1.0 | 0/10 |
| H | 0.3% | CdS | 9.6 | 19.6 | 26.8 | 1.0 | 0/10 |
| I | 3.0% | CdS | 0.3 | 3.3 | 6.6 | 0.5 | 0/10 |
| J | 0.3% | CaS | 13.8 | 20.0 | 23.3 | 1.0 | 0/10 |
| K | 3.0% | CaS | 6.2 | 9.5 | 15.8 | 0.5 | 0/10 |
| L | 0.3% | HgS | 16.2 | 16.9 | 17.7 | 1.0 | 0/10 |
| M | 3.0% | HgS | 7.0 | 8.3 | 11.4 | 1.0 | 0/10 |
| N | 0.3% | PbS | 19.8 | 23.9 | 25.6 | 1.0 | 0/10 |
| O | 3.0% | PbS | 21.0 | 28.4 | 29.0 | 1.0 | 1/10 |
| P | 0.3% | BaS | 12.7 | 20.3 | 26.5 | 1.0 | 0/10 |
| Q | 3.0% | BaS | rupture | — | — | 1.5 | 10/10 |
| R | 0.3% | NiS | rupture | — | — | 12.0 | 10/10 |
| S | 3.0% | NiS | rupture | — | — | 20.0 | 10/10 |

-continued

|   | Additive |      | 160° F |       | Room Temperature | No. of Dead Cells After 1 |
|---|----------|------|--------|-------|------------------|---------------------------|
|   |          | 1 wks | 2 wks | 3 wks | 6 wks            | wk at 160° F              |
| T | 0.3% MnS | rupture | — | — | — | 10/10 |
| U | 3.0% MnS | rupture | — | — | — | 10/10 |
| V | 0.3% CuS | rupture | — | — | — | 10/10 |
| W | 3.0% CuS | rupture | — | — | — | 10/10 |

TABLE 2: The effect of various additives on impedance, CCV and capacity of RW44[(1)] cells.

EXAMPLE 3

Table 2

The effect of various additives on impedence, CCV and capacity of RW44[(1)] cells.

| Lot No. | Additive | Cell Impedence and CCV[(2)] Storage at 160° F for 1 week | | after | | | | Cap. (MAH/cell) to 0.90v os 623 ohms 16/H/D |
|---|---|---|---|---|---|---|---|---|
| | | | | 2 weeks | | 3 weeks | | |
| | | Imp. (ohms) | CCV (volts) | Imp. (ohms) | CCV (volts) | Imp. (ohms) | CCV (volts) | |
| A | No Additive | 28.7 | 1.30 | 3.5 | 1.53 | 6.7 | 1.49 | 161 |
| B | 0.3% Gold Hydroxide | 43.0 | 1.19 | 35.4 | 1.19 | 38.4 | 1.23 | 159 |
| C | 3.0% Gold Hydroxide | 10.8 | 1.43 | 3.3 | 1.54 | 4.9 | 1.51 | 159 |
| D | 0.3% Cadmium Oxide | 18.2 | 1.34 | 3.0 | 1.52 | 3.1 | 1.53 | 160 |
| E | 3.0% Cadmium Oxide | 17.3 | 1.40 | 2.8 | 1.52 | 2.9 | 1.53 | 160 |
| F | 0.3% Silver Sulfide | 28.5 | 1.30 | 7.5 | 1.49 | 3.5 | 1.53 | 163 |
| G | 3.0% Silver Sulfide | 14.2 | 1.44 | 2.8 | 1.53 | 4.0 | 1.51 | 162 |
| H | 0.3% Cadmium Sulfide | 16.9 | 1.34 | 3.9 | 1.51 | 3.1 | 1.53 | 157 |
| I | 3.0% Cadmium Sulfide | 2.3 | 1.55 | 2.0 | 1.54 | 6.9 | 1.50 | 161 |
| J | 0.3% Calcium Sulfide | 30.0 | 1.30 | 5.4 | 1.49 | 15.7 | 1.47 | 161 |
| K | 3.0% Calcium Sulfide | 35.9 | 1.15 | 25.5 | 1.18 | 14.0 | 1.45 | 159 |
| L | 0.3% Mercuric Sulfide | 29.6 | 1.24 | 26.3 | 1.20 | 38.0 | 1.15 | 160 |
| M | 3.0% Mercuric Sulfide | 28.4 | 1.22 | 25.9 | 1.20 | 25.2 | 1.14 | 161 |
| N | 0.3% Lead Sulfide | 30.1 | 1.31 | 6.6 | 1.50 | 5.0 | 1.51 | 158 |
| O | 3.0% Lead Sulfide | 15.8 | 1.47 | 15.1 | 1.42 | 22.2 | 1.39 | 159 |
| P | 0.3% Barium Sulfide | 34.6 | 1.31 | 9.5 | 1.49 | 4.4 | 1.52 | 163 |
| Q | 3.0% Barium Sulfide | —[(3)] | — | — | — | — | — | 162 |
| R | 0.3% Nickel Sulfide | — | — | — | — | — | — | — |
| S | 3.0% Nickel Sulfide | — | — | — | — | — | — | — |
| T | 0.3% Manganese Sulfide | — | — | — | — | — | — | — |
| U | 3.0% Manganese Sulfide | — | — | — | — | — | — | — |
| V | 0.3% Cupric Sulfide | — | — | — | — | — | — | — |
| W | 3.0% Cupric Sulfide | — | — | — | — | — | — | — |

[(1)]Average of 10 cells/lot.
[(2)]Impedance and CCV were measured at 1000 Hz and 30 ohms, respectively.
[(3)]means extreme bulging or rupture.

EXAMPLE 2

Cells having the same construction and components as in Example 1 were made. The only differences were the sulfide additive utilized and the silver dioxide had a gassing rate of 75 $\mu$ 1/gm/hr in 18% NaOH + 1.25% ZnO at 74° C.

The ten cells of each type were tested for stability by the same method as Example 1. The results are within the following Table 3.

| Ago Additive | 160° F Storage-1wk | | Room Temp. - 6 mo. Cell Expansion in Mils[2] |
|---|---|---|---|
| | Cell Expansion in Mils[1] | #Dead Cells | |
| None | 25.5 | 0/6 | 8.2 |
| 3.0% SnS$_2$ | 13.3 | 0/6 | 6.8 |
| 3.0% SnS | 23.8 | 0/6 | 6.0 |
| 3.0% WS$_2$ | 17.3 | 1/6 | 6.8 |
| 3.0% Ti$_2$S$_3$ | 23.8 | 0/6 | 6.6 |

Cells having the same construction and components as in Example 2 were made, the only variation being the sulfide addition utilized.

Six cells of each type were tested as in Example 1.

| AgO Additive | 160° F Storage-1wk | |
|---|---|---|
| | Cell Expansion in Mils | #Dead Cells |
| None | 20.8 | 0/10 |
| 3.0% CdS | 6.3 | 0/10 |
| 3.0% SnS$_2$ | 9.5 | 0/10 |
| 3.0% WS$_2$ | 10.7 | 0/10 |

EXAMPLE 4

Six cells of each of the following types were made as in Example 1. The AgO used had a gassing rate of 75 $\mu$ 1/gm/hr in 18% NaOH + 1.25% ZnO at 75° C. They were tested to find the effects of CdS concentration on stability.

| | Additive | Expansion in mils at 160° F | | | Expansion in Mils at Room Temperature for 6 wks | Cell Impt (ohms) | Target OCV (volts) | CCV at 30 ohms (volts) | Amps | Gassing Rate of Mix at 160° F in 18% NaOH + 1.25% ZnO (Ml/g/hr) |
|---|---|---|---|---|---|---|---|---|---|---|
| | | 1 wk | 2 wks | 3 wks | | | | | | |
| A | None | 21.5 | 31.5 | 37.0 | 1.0 | 31.5 | 1.58 | 1.10 | .29 | 110.5 |
| B | 1% CdS | 13.6 | 22.8 | 28.7 | 0.5 | 14.0 | 1.57 | 1.26 | .39 | 58.5 |
| C | 2% CdS | 6.8 | 15.2 | 22.5 | 0.5 | 2.6 | 1.58 | 1.33 | .56 | 58.9 |
| D | 3% CdS | 4.8 | 9.8 | 13.5 | 0.5 | 3.1 | 1.58 | 1.32 | .49 | 61.8 |

-continued

|   | Additive | Expansion in mils at 160° F 1 wk | 2 wks | 3 wks | Expansion in Mils at Room Temperature for 6 wks | Cell Impt (ohms) | Target OCV (volts) | CCV at 30 ohms (volts) | Amps | Gassing Rate of Mix at 160° F in 18% NaOH + 1.25% ZnO (Ml/g/hr) |
|---|---|---|---|---|---|---|---|---|---|---|
| E | 4% CdS | 3.8 | 9.4 | 14.0 | 0.5 | 2.6 | 1.58 | 1.33 | .58 | 63.8 |
| F | 5% CdS | 3.5 | 8.8 | 13.3 | 0.5 | 2.2 | 1.58 | 1.35 | .66 | NA |

EXAMPLE 5

Six cells of each of the following types were made as in Example 4. However the AgO cathode mix was a mixture of 50% AgO, 48.5% Ag$_2$O and 1.5% Teflon, and the consolidations were hydrazine treated. The cells were tested to determine the effects of CdS concentration on cell stability.

|   | Additive | Expansion in mils at 60° F 1 wk | 2 wks | 3 wks | Expansion is Mils at Room Temperature for 6 wks | Cell Impt (ohms) | Target OCV (volts) | CCV at 30 ohms (volts) | Amps | Gassing Rate of Mix at 160° F in 18% NaOH + 1.25% ZnO (Ml/g/hr) |
|---|---|---|---|---|---|---|---|---|---|---|
| A | None | 6.6 | 13.5 | 16.7 | 1.0 | 3.1 | 1.58 | 1.31 | .48 | 41.1 |
| B | 1% CdS | 3.0 | 5.0 | 9.2 | 0.5 | 3.2 | 1.58 | 1.39 | .43 | 27.0 |
| C | 2% CdS | 1.8 | 2.8 | 3.7 | 0.5 | 2.5 | 1.58 | 1.44 | .54 | 25.6 |
| D | 3% CdS | 1.0 | 2.0 | 3.2 | 0.5 | 2.4 | 1.58 | 1.44 | .57 | 24.3 |
| E | 4% CdS | 1.6 | 2.2 | 4.0 | 0.5 | 2.9 | 1.58 | 1.43 | .55 | 20.7 |
| F | 5% CdS | 2.0 | 2.8 | 3.0 | 0.5 | 2.3 | 1.58 | 1.45 | .68 | 22.3 |

EXAMPLE 6

Cells were made as in Example 1; however, the cathode pellet was treated differently. The cathode mix was compressed and then consolidated into the outer can with a retainer ring. It was then immersed in a 3% by weight hydrazine in methanol solution for 3 minutes to form a substantially continuous silver layer.

The cells were tested for various properties. The results are listed in the following table.

| Lot | Additive | Capacity to 0.90v 1500Ωcont |
|---|---|---|
| A | 0.3% Au(OH)$_3$ | 172 mAH |
| B | 1.5% CdS | 173 |
| C | 1.5% CdS | 173 |

Initial Target

| Z | OCV | 30Ω CCV | AMP | Cell Expansion 1 wk 160° F |
|---|---|---|---|---|
| 3.6 | 1.60v | 1.41v | .53A | 3.0 mils |
| 2.9 | 1.61 | 1.44v | .59 | 3.0 mils |
| 2.6 | 1.59 | 1.46v | .65 | 2.6 mils |

Shelf Life: 12 wks 113° F/50% R.H.

| Z | OCV | 30Ω CCV | AMP | Cell Expansion | Capacity MAH | % Initial |
|---|---|---|---|---|---|---|
| 3.5 | 1.60v | 1.41v | .51A | 2.5 mils | 119 | 69.2 |
| 3.4 | 1.59 | 1.42 | .53 | 0.5 | 140 | 81.0 |
| 3.2 | 1.58 | 1.28 | .53 | 0.2 | 176 | 100.0 |

Delayed Target: 3 Months Room Temperature

| Z | OCV | CCV 30Ω | AMP | Cell Expansion |
|---|---|---|---|---|
| 59.6 | 1.64v | 1.05 | .33A | 1.6 mils |
| 3.0 | 1.58 | 1.37 | .53 | 0.3 |
| 2.0 | 1.59 | 1.37 | .71 | 1.3 |

We claim:

1. An alkaline battery having a negative electrode, an alkaline electrolyte, a divalent silver oxide positive electrode material having a divalent silver oxide content of at least 50% by weight, and a semi-permeable barrier separator between said negative and positive electrodes, the improvement comprising the positive electrode material containing a sulfide additive selected from the group consisting of cadmium sulfide, calcium sulfide, mercury sulfide, tin sulfide, tungsten sulfide and mixtures thereof.

2. The battery of claim 1 whereas the additive is present in an amount ranging from about 0.5% to about 10% by weight of silver in the positive electrode material.

3. The battery of claim 1 wherein the additive is present in an amount ranging from 1 to 3% by weight of silver in the positive active material.

4. The battery of claim 2 wherein, the additive is cadmium sulfide, calcium sulfide, mercury sulfide, stannic sulfide or tungsten sulfide.

5. The battery of claim 3 wherein the additive is cadmium sulfide.

6. The battery of claim 5 wherein the additive is present in an amount ranging from 1.25–2% by weight of the silver in the positive electrode material.

7. An alkaline battery having a negative electrode, an alkaline electrolyte, a divalent silver oxide positive electrode having a divalent silver oxide (AgO) content of at least 50% by weight, and a semi-permeable barrier separator between said negative and positive electrodes, the improvement comprising,
said alkaline electrolyte only on the positive electrode side of said barrier separator containing a sulfide additive selected from the group consisting of cadmium sulfide, calcium sulfide, mercury sulfide, tin sulfide, tungsten sulfide and mixtures thereof.

8. The battery of claim 7 wherein the additive is present in an amount ranging from about 0.1% to about 10% by weight of silver in the positive electrode material.

9. The battery of claim 1 wherein the alkaline electrolyte is sodium hydroxide or potassium hydroxide.

10. The battery of claim 1 in which the divalent silver oxide (AgO) content of the positive electrode active material comprises at least about 90% by weight of the active material.

* * * * *